United States Patent
Kolof et al.

(10) Patent No.: US 7,000,148 B2
(45) Date of Patent: Feb. 14, 2006

(54) PROGRAM-CONTROLLED UNIT

(75) Inventors: Andreas Kolof, Gröbenzell (DE); Albrecht Mayer, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 604 days.

(21) Appl. No.: 10/154,296

(22) Filed: May 23, 2002

(65) Prior Publication Data
US 2002/0194549 A1 Dec. 19, 2002

(30) Foreign Application Priority Data
May 23, 2001 (DE) ................................ 101 25 388

(51) Int. Cl.
*G06F 11/00* (2006.01)
(52) U.S. Cl. ........................... 714/27; 714/30; 714/733
(58) Field of Classification Search .................. 714/27, 714/28, 30, 34, 733, 734, 44
See application file for complete search history.

(56) References Cited

U.S. PATENT DOCUMENTS

| | | | |
|---|---|---|---|
| 5,053,949 A * | 10/1991 | Allison et al. ................. | 714/31 |
| 5,491,793 A * | 2/1996 | Somasundaram et al. ..... | 714/45 |
| 5,826,047 A | 10/1998 | Dunn et al. | |
| 5,943,498 A | 8/1999 | Yano et al. | |
| 6,175,913 B1 * | 1/2001 | Chesters et al. ............. | 712/227 |
| 6,321,349 B1 * | 11/2001 | Hennessy ..................... | 714/39 |
| 2003/0065829 A1 * | 4/2003 | Rasmussen et al. ........... | 710/1 |

FOREIGN PATENT DOCUMENTS

| | | |
|---|---|---|
| DE | 37 23 754 A1 | 1/1989 |
| EP | 0 720 092 A1 | 7/1996 |
| EP | 0 764 903 A1 | 3/1997 |

\* cited by examiner

*Primary Examiner*—Scott Baderman
(74) *Attorney, Agent, or Firm*—Laurence A. Greenberg; Werner H. Stemer; Ralph E. Locher

(57) ABSTRACT

A program-controlled unit is described. The program-controlled unit has a central processing unit (CPU), peripheral units that are connected to the CPU via an internal bus, and debug resources that can be used to trace and influence operations taking place in the program-controlled unit. The program-controlled unit that is described is characterized in that the debug resources and the peripheral units, which output data from the program-controlled unit and/or can receive and pass on data which is supplied to the program-controlled unit from the outside, are connected to one another via a second internal bus. The data that is to be transmitted between the debug resources and devices provided outside the program-controlled unit are transmitted via the second internal bus and individual, a plurality of, or all the peripheral units connected thereto.

12 Claims, 1 Drawing Sheet

PROGRAM-CONTROLLED UNIT

BACKGROUND OF THE INVENTION

Field of the Invention

The present invention relates to a program-controlled unit having a CPU, peripheral units which are connected to the CPU via an internal bus, and debug resources that can be used to trace and influence operations taking place in the program-controlled unit.

Program-controlled units such as microprocessors, microcontrollers, signal processors, etc. have been known in numerous embodiments for many years.

A known problem of program-controlled units is that faults that occur in them frequently cannot be readily localized and/or eliminated.

The localization and elimination of faults occurring in program-controlled units were carried out earlier, and to a certain extent are also carried out now using special bond-out versions of the program-controlled units to be examined. Bond-out versions of program-controlled units differ from the standard versions of the respective program-controlled units used in mass-produced items in that they have more input ports and/or output ports, the additional input ports and/or output ports are connected to locations in the program-controlled unit which are not freely accessible in the standard version of the program-controlled unit. As a result, information relating to internal states or operations, to be more precise addresses, data and/or control signals, such as, for example but by far not exclusively, the respective current state of the program counter, which are not normally output can be output from the program-controlled unit and evaluated outside the program-controlled unit. The sequence of the operations occurring within the program-controlled unit can be traced by virtue of the evaluation of the information, as a result of which faults occurring in the program-controlled unit can be localized and eliminated.

However, the use of bond-out versions is associated with a series of disadvantages. In particular, the bond-out versions of program-controlled units are larger and more expensive than the standard versions and, something that is even more important, the bond-out versions generally do not behave precisely in the same way as the standard versions.

For this reason, to a certain extent the practice of equipping program-controlled units with debug resources has been adopted.

The debug resources are preferably capable of outputting what is referred to as trace information. For this purpose, the occurrence within the program-controlled unit of conditions which can be predefined from outside the program-controlled unit is monitored by the debug resources, and whenever the condition or one of the conditions is fulfilled addresses, data and/or control signals which can be predefined from outside the program-controlled unit are output from the program-controlled unit without interrupting the operation of the program-controlled unit. As a result, it is possible, for example but by far not exclusively, that whenever a central processing unit (CPU) would like to read data from a specific address or specific address region, the data that is subsequently supplied to the CPU is output from the program-controlled unit by the debug resources.

In general, the debug resources furthermore also carry out further actions that are necessary or are helpful for the localization and elimination of faults occurring in the program-controlled unit. For example, the debug resources are capable of stopping the program-controlled unit when specific conditions occur, for example when a specific program counter reading is reached, and of reading out or changing the contents of registers which are of interest.

Such debug resources that are also referred to as on-chip debug support (OCDS) modules or on-chip emulation (OCE) modules are known so that further details will not be described.

Owing to the increasing significance of the provision of debug resources in program-controlled units, a standard for the interface which is referred to as "The Nexus 5001 Forum Standard for a Global Embedded Processor Debug Interface" was defined in 1999 by the IEEE Industry Standards and Technology Organization (IEEE-ISTO), by which standard the debug resources can exchange data in a particularly efficient way with a device which is provided outside the program-controlled unit, for example with a debug control unit or emulation control unit, or with a measuring device such as, for example, a logic analyzer.

The implementation of the interface as a NEXUS interface makes it possible for the interface to be made small in size, i.e. in particular contain only a small number of pins, even if large amounts of data are to be transferred via it.

However, the small number of additional pins can also be disruptive for specific applications of the program-controlled unit. This is the case if the program-controlled unit, such as for example a program-controlled unit that is used in a mobile phone, is to be as small as possible.

SUMMARY OF THE INVENTION

It is accordingly an object of the invention to provide a program-controlled unit that overcomes the above-mentioned disadvantages of the prior art devices of this general type, in which as few additional pins as possible are necessary for exchanging data between the debug resources and a device which is provided outside the program-controlled unit.

With the foregoing and other objects in view there is provided, in accordance with the invention, a program-controlled unit. The program-controlled unit contains a first internal bus, a CPU connected to the first internal bus, peripheral units connected to the first internal bus and the CPU through the first internal bus, a second internal bus, and debug resources for tracing and influencing operations taking place. The debug resources and the peripheral units, which output data from the program-controlled unit and/or can receive and pass on data that is supplied externally to the program-controlled unit, are connected to one another through the second internal bus. The data that is transmitted between the debug resources and devices disposed external to the program-controlled unit are transmitted through the second internal bus and at least one of the peripheral units connected to the second internal bus.

The program-controlled unit according to the invention is characterized in that the debug resources and the peripheral units, which output data from the program-controlled unit and/or can receive and pass on data which is supplied to the program-controlled unit from the outside, are connected to one another via a second internal bus. The data that are to be transmitted between the debug resources and the devices provided outside the program-controlled unit is transmitted via the second internal bus and at least one of the peripheral units connected thereto.

That is to say components of the program-controlled unit that are provided in any case in the program-controlled unit are used for exchanging data between the debug resources and a device provided outside the program-controlled unit, and consequently no additional interfaces or pins are required.

Due to the fact that the debug resources are connected via a separate bus to the peripheral units that transfer the data from and to the debug resources, there is no risk, despite the common use of peripheral units, that the debug resources and the remaining components of the program-controlled unit will interfere with one another.

In accordance with an added feature of the invention, the peripheral units are capable of outputting the data from the program-controlled unit that has been acquired through the first internal bus or the second internal bus. The peripheral units are capable of passing on the data acquired from outside the program-controlled unit through the first internal bus or the second internal bus. The peripheral units which are connected to both the first internal bus and the second internal bus have a control logic by which it is specified whether, and/or under which circumstances, the peripheral units output the data from the program-controlled unit which has been supplied to them through the first internal bus and the second internal bus. The peripheral units which are connected to both the first internal bus and the second internal bus contain a control logic by which it is specified whether, and/or under which circumstances, the peripheral units receive and pass on the data which has been acquired from outside the program-controlled unit. The control logic is controlled by a program executed by the CPU or by the debug resources.

In accordance with another feature of the invention, an intelligent system is provided for arbitrating accesses to the peripheral units that are connected both to the first internal bus and to the second internal bus. The intelligent system is connected to the second internal bus. The intelligent system can be in the form of a further CPU. The intelligent system optimizes a transmission of the data.

In accordance with a further feature of the invention, whether, and if so, which of the data is output from the program-controlled unit, or received and passed on from outside the program-controlled unit, by the peripheral units is made dependent on at least one of a data source and a destination of the data.

In accordance with a concomitant feature of the invention, whether, and if so, which of the data is output from the program-controlled unit or received and passed on from outside the program-controlled unit is made dependent on a bandwidth assigned to possible data sources and/or destinations of the data.

Other features which are considered as characteristic for the invention are set forth in the appended claims.

Although the invention is illustrated and described herein as embodied in a program-controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
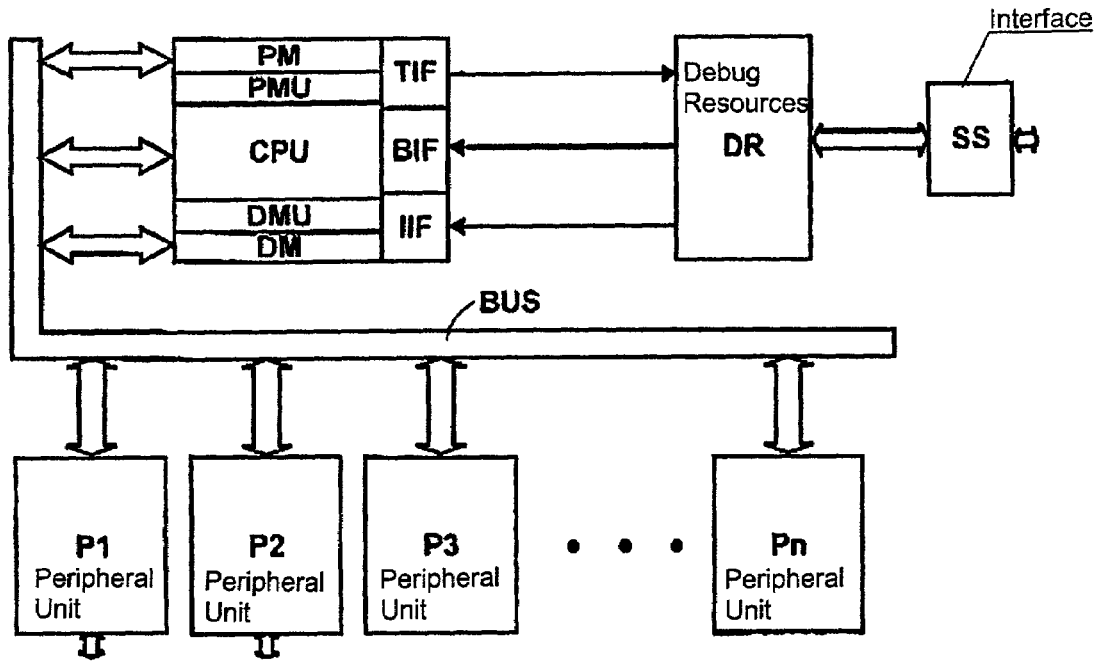
FIG. 2 is a block diagram of a conventional program-controlled unit.

Referring now to the figures of the drawing in detail and first, particularly, to FIG. 2 thereof, there is shown a known program-controlled unit. The program-controlled unit shown in FIG. 2 is a microcontroller and contains a central processing unit (CPU) CPU, a program memory PM which is connected to the CPU via a program-memory management unit PMU, a data memory DM which is connected to the CPU via a data-memory management unit DMU, peripheral units P1 to Pn, a bus BUS which connects the CPU, the program memory PM, the data memory DM and the peripheral units P1 to P5 to one another, debug resources DR, and an interface SS which is assigned to the debug resources DR and via which the debug resources DR output data which is to be output to an external device and via which the debug resources DR receive data from the external device.

The peripheral units P1 to Pn are, for example, an A/D converter, a timer, a coder, a compression device, a USB interface, a CAN interface, an Ethernet interface or other units which can be integrated into microcontrollers.

The debug resources DR are preferably capable of outputting what is referred to as trace information. For this purpose, the occurrence within the program-controlled unit of conditions which can be predefined from outside the program-controlled unit is monitored by the debug resources DR, and whenever the condition or one of the conditions is fulfilled addresses, data and/or control signals which can be predefined from outside the program-controlled unit are output from the program-controlled unit without interrupting the operation of the program-controlled unit. As a result, it is possible, for example but by far not exclusively, that whenever the CPU would like to read data from a specific address or specific address region, the data that is subsequently supplied to the CPU is output from the program-controlled unit by the debug resources DR.

In general, the debug resources DR furthermore also carry out further actions which are necessary or are helpful for the localization and elimination of faults occurring in the program-controlled unit. For example, the debug resources DR are capable of stopping the program-controlled unit when specific conditions occur, for example when a specific program counter reading is reached, and of reading out or changing the contents of registers which are of interest. As noted-above, the implementation of the interface SS requires the need for additional pins that is considered undesirable.

Figure 1:
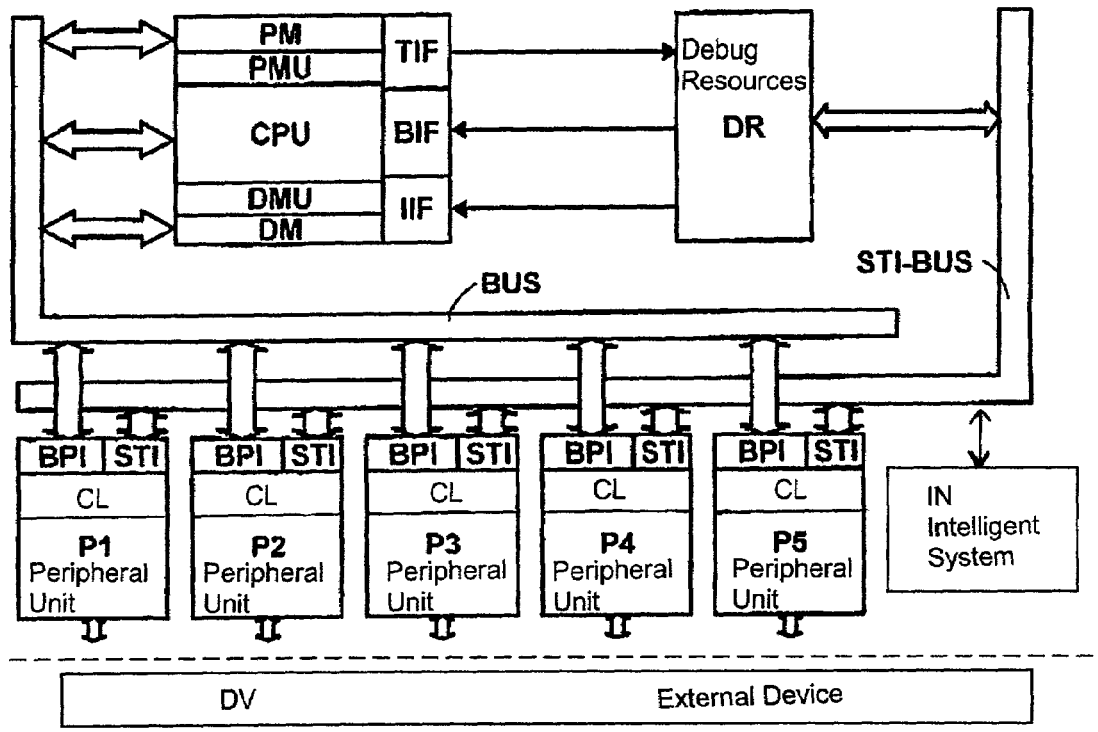
FIG. 1 is a block diagram of a program-controlled unit according to the invention.

The program-controlled unit according to the invention dispenses with the need for the interface SS and is shown in FIG. 1. The program-controlled unit described below is a microcontroller. The particular features of the microcontroller can, however, also be used in any other desired program-controlled units.

For the sake of completeness, it is to be noted that only the components of the program-controlled unit that are of particular interest here are shown and described.

The program-controlled unit shown in FIG. 1 contains the CPU CPU, the program memory PM which is connected to the CPU via the program-memory management unit PMU, the data memory DM which is connected to the CPU via the data-memory management unit DMU, the peripheral units P1 to P5, the debug resources DR, a first internal bus BUS which connects the CPU, the program memory PM, the data memory DM and the peripheral units P1 to P5 to one another, and a second internal bus STI-BUS which connects the debug resources DR and the peripheral units P1 to P5 to one another.

The peripheral units P1 to P5 are interfaces via which data can be output from the program-controlled unit to a device DV that is provided outside the program-controlled unit, and/or the program-controlled unit can receive data from the device DV that is provided outside the program-controlled unit.

Of the peripheral units P1 to P5, in the example under consideration the peripheral unit P1 is a USB interface, the peripheral unit P2 is a CAN interface, the peripheral unit P3 is an Ethernet interface, the peripheral unit P4 is a serial ATA interface, and the peripheral unit P5 is some other interface for inputting and/or outputting data from, and respectively into, the program-controlled unit.

For the sake of completeness it is to be noted that any other desired components of the program-controlled unit, for example an A/D converter, a timer, a coding device, a compression device, etc. can also be connected to the first internal bus BUS.

The debug resources DR are not on the first bus or are only on the first bus BUS for monitoring purposes. On the other hand, the CPU, the program memory PM, the data memory DM and peripheral units which cannot output any data from the program-controlled unit and cannot receive any data from outside the program-controlled unit are not connected to the second bus STI-BUS.

The peripheral units, which can output data from the program-controlled unit and/or can receive data from devices DV provided outside the program-controlled unit are, however, at least partially connected both to the first bus BUS and to the second bus STI-BUS. Each of the peripheral units, i.e. each of the peripheral units P1 to P5 has an interface BPI with the first bus BUS and an interface STI with the second bus STI-BUS.

The peripheral units P1 to P5 are thus capable of outputting, from the program-controlled unit, either data which has been output by the components connected to the first bus BUS or data which has been output from the debug resources DR, and/or of passing on data which is received from the device DV provided outside the program-controlled unit, either to one of the components connected to the first bus BUS, or to the debug resources DR.

The peripheral units P1 to P5 also each contain control logic CL by which it is determined whether, and if so at what times or under what conditions and/or to what extent, the respective peripheral unit is used for data transfers from and to the components connected to the first bus and from and to the debug resources DR.

The simplest case is that one or more peripheral units are reserved completely for data transfers from and to the debug resources DR. This is possible if the respective peripheral unit is not required elsewhere (for example because the Ethernet connection is not being used in the current application of the program-controlled unit).

It could also be provided that specific minimum bandwidths are reserved by the peripheral units for data transfers from and to the components connected to the first bus BUS and/or from and to other peripheral units and/or from and to the debug resources DR.

However, it could also be provided that the peripheral units prioritize the data to be transferred, for example as a function of the data source and/or the destination of the data, that is to say for example only output data received via the bus STI-BUS if, and for as long as, they do not receive data to be output via the first bus BUS at the same time.

Independently of all the above it is possible that the data to be transferred from and to the debug resources DR is output or received simultaneously by a plurality of the peripheral units P1–P5, and that different items of the data to be transferred from and to the debug resources DR are output or received by different peripheral units.

The control logic CL is—insofar as it is necessary—controlled in the example under consideration by the CPU, to be more precise by the program executed by the CPU, but could also be controlled by the debug resources DR or the device DV provided outside the program-controlled unit.

However, there could also be provision to connect an additional intelligent system IN, for example a further CPU, to the STI-BUS. The additional intelligent system IN can, for example, optimize the transmission of data, arbitrate the accesses to the peripheral units and, if appropriate, perform further functions. The optimization of the transmission of data can consist, for example, in the data that is output by the debug resources DR being preprocessed or converted into a different format, the data being compressed or decompressed, the data being, when necessary (for example when the peripheral units P1 to P5 do not have sufficient free transmission capacities), reduced in scope in the program-controlled unit or buffered, and/or a determination being carried out of which data or data items are to be transmitted, or have been received, via which peripheral unit.

The program-controlled unit described makes it possible for data that is to be transferred between the debug resources DR and the device DV which is provided outside the program-controlled unit to be transmitted via interfaces and pins which are present in any case in the program-controlled unit.

This removes the necessity to have to provide a separate interface and additional pins for data transfers from and to the debug resources DR.

By virtue of the fact that the debug resources DR are connected via a separate bus, specifically the bus STI-BUS, to the peripheral units P1–P5 via which data can be output from the program-controlled unit and received by the program-controlled unit, it is possible to prevent data transfers from and to the debug resources DR adversely affecting the operation of the program-controlled unit and data transfers between the components connected to the first bus adversely affecting the data transfers from and to the debug resources.

It should be apparent that the program-controlled unit described can be modified in many respects.

For example, the particular features described above can also be used in program-controlled units that contain a plurality of cores and/or more or fewer other components.

In addition it is possible that the data to be output by the debug resources DR is not output immediately from the program-controlled unit via the interface SS but rather stored within the program-controlled unit until it is required by the external device for which this data is intended.

In a program-controlled unit which is constructed in the way described or in a similar way, there is, irrespective of the details of the practical implementation, no need to provide a separate interface and separate pins for exchanging data between the debug resources and a device provided outside the program-controlled unit.

We claim:

1. A program-controlled unit, comprising:
   a first internal bus;
   a CPU connected to said first internal bus;
   peripheral units connected to said first internal bus and said CPU through said first internal bus;

a second internal bus; and debug resources separate from said peripheral units for tracing and influencing operations taking place, said debug resources and said peripheral units, which output data from the program-controlled unit and/or can receive and pass on data which is supplied externally to the program-controlled unit, being connected to one another through said second internal bus, and the data being transmitted between said debug resources and devices disposed external to the program-controlled unit being transmitted through said second internal bus and at lease one of said peripheral units connected to said second internal bus.

2. The program-controlled unit according to claim 1, wherein said peripheral units are capable of outputting the data from the program-controlled unit which has been acquired through one of said first internal bus and said second internal bus.

3. The program-controlled unit according to claim 1, wherein said peripheral units are capable of passing on the data acquired from outside the program-controlled unit through one of said first internal bus and said second internal bus.

4. The program-controlled unit according to claim 1, wherein said peripheral units which are connected to both said first internal bus and said second internal bus have a control logic by which it is specified whether, and/or under which circumstances, said peripheral units output the data from the program-controlled unit which has been supplied to them through said first internal bus and said second internal bus.

5. The program-controlled unit according to claim 1, wherein said peripheral units which are connected to both said first internal bus and said second internal bus contain a control logic by which it is specified whether, and/or under which circumstances, said peripheral units receive and pass on the data which has been acquired from outside the program-controlled unit.

6. The program-controlled unit according to claim 5, wherein said control logic is controlled by a program executed by said CPU.

7. The program-controlled unit according to claim 5, wherein said control logic is controlled by said debug resources.

8. The program-controlled unit according to claim 1, further comprising an intelligent system for arbitrating accesses to said peripheral units which are connected both to said first internal bus and to said second internal bus, said intelligent system is connected to said second internal bus.

9. The program-controlled unit according to claim 8, wherein said intelligent system is a further CPU.

10. The program-controlled unit according to claim 8, wherein said intelligent system optimizes a transmission of the data.

11. The program-controlled unit according to claim 1, wherein whether, and if so, which of the data is output from the program-controlled unit, or received and passed on from outside the program-controlled unit, by said peripheral units is made dependent on at least one of a data source and a destination of the data.

12. The program-controlled unit according to claim 1, wherein whether, and if so, which of the data is output from the program-controlled unit or received and passed on from outside the program-controlled unit is made dependent on a bandwidth assigned to possible data sources and/or destinations of the data.

* * * * *